United States Patent [19]

Ciliberti, Jr. et al.

[11] 4,122,241
[45] Oct. 24, 1978

[54] MODIFIED GROMMET FOR LONG TERM USE CELLS

[75] Inventors: Frank L. Ciliberti, Jr.; Franklin G. Fagan, Jr., both of Ossining, N.Y.

[73] Assignee: P. R. Mallory & Co. Inc., Indianapolis, Ind.

[21] Appl. No.: 776,680

[22] Filed: Mar. 11, 1977

[51] Int. Cl.² ............................................. H01M 2/18
[52] U.S. Cl. .................................. 429/133; 429/172; 429/174; 429/185
[58] Field of Search ................................ 429/133–141, 429/171–174, 185

[56] References Cited

U.S. PATENT DOCUMENTS

| 2,822,416 | 2/1958 | Parkinson | 429/133 |
| 3,068,312 | 12/1962 | Daley et al. | 429/174 |
| 3,754,997 | 8/1973 | Ralston | 429/171 X |
| 3,802,923 | 4/1974 | Spanur | 429/172 X |
| 3,852,115 | 12/1974 | Lewis et al. | 429/133 X |

Primary Examiner—Charles F. LeFevour
Attorney, Agent, or Firm—Ronald S. Cornell; Israel Nissenbaum; Charles W. Hoffmann

[57] ABSTRACT

A sealing grommet in a cylindrical electrochemical cell designed for long term use, the grommet having an extended area which is compressed between a separator having structural integrity and a cell top.

8 Claims, 3 Drawing Figures

MODIFIED GROMMET FOR LONG TERM USE CELLS

This invention relates to sealing grommets for electrochemical cells and in particular to sealing grommets for cylindrical electrochemical cells, designed for long term use heart pacemakers.

Grommets in electrochemical cells in the past have generally had the purpose of providing a resilient seal in the closure of such cells after they had been filled. Additionally, they were of necessity non-conductive so that a cell closure member could be electrically isolated from the cell container whereby the two enumerated elements could function as the two terminals of the cell. Accordingly, the grommet was generally positioned around the flange of a cell closure member in the area where the cell was compressingly sealed. Occasionally some grommets extended further within the cell and were supported by an electrode structure, generally the cathode. In some instances the grommet was totally supported by the cell top and in the form of a cup.

Prior art grommets in general did not prevent the internal migration paths between anode and cathode (or electrically conductive elements dependent thereon) which resulted from a deterioration of separator material under long term usage conditions. These migration paths are to be differentiated from the normal electrolyte leakage paths since the electrolyte is ionically conductive and will not normally short out the cell. In fact, the cell is dependent upon such ionic connection between anode and cathode and only prevention of external electrolyte leakage is generally the objective. The migration which is detrimental is that of the electronically conductive cell reaction products. When the cell anode and cathode are thus electronically bridged there is an internal shorting with a concomitant loss of life of the cell.

Prior art cells in general have not encountered this type of difficulty since it takes several years for the separator materials which are normally used to deteriorate to such a degree that migration paths are formed, and most cells do not have lifetimes of such duration. However, batteries for long term use such as pacemaker applications may be subject to migration of electronically conductive materials between anode and cathode engendered by long term separator deterioration, and the full theoretical capacity of such cells has therefore been difficult to obtain.

It is an object of the present invention to provide a means by which long term separator deterioration does not result in intracellular electronically conductive material migration and cell shorting.

This and other objectives of the present invention will become apparent from the following description as well as the drawings in which.

Figure 1:
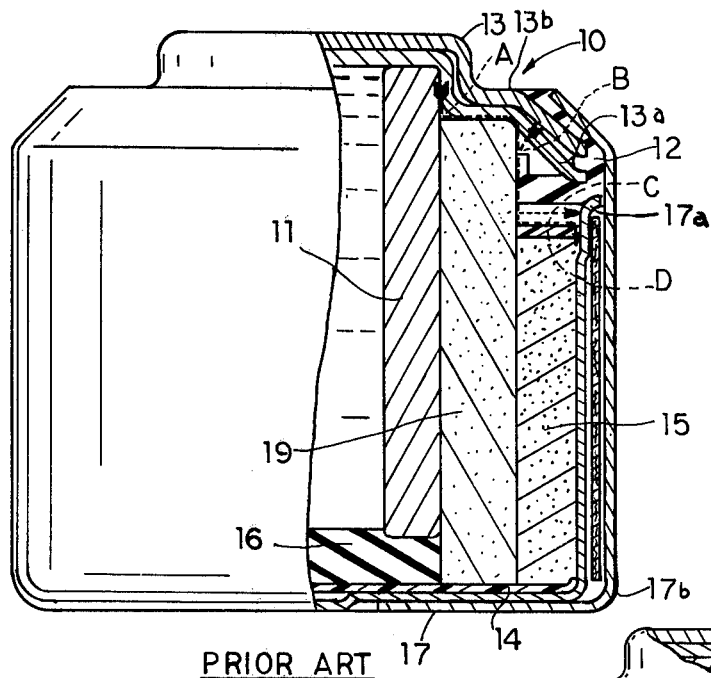
FIG. 1 is a partial cross-sectional view of a prior art battery for heart pacemaker application.

Generally, cylindrical cells of elongated form have concentric electrodes and separators. The separator extends from the bottom of the cell to the cell top in such a manner as to completely electronically isolate the anode from the cathode. FIG. 1 shows a conventional cell of such construction with the anode 11 centrally located and electrically in contact with the double top 13 which serves as the negative terminal of the cell. Double top 13 includes an inner member 13a and an outer member 13b. The cathode depolarizer 15 is in electrical contact with the container 17 of the cell which operates as the positive terminal of the cell. The separator 19 comprises three general components in the form of annular cylinders in successive layers of increasing diameter. The separator extends from the inner double top member 13a at the top to the insulative disc 14 at the bottom thereby completely isolating anode 11 from cathode 15. The three components (not shown individually) comprise a paper absorbent, a cellulosic barrier and a polymeric barrier, with only the former two materials being subject to degradation.

A grommet 12 extends from the upper end of the cell container 17b, around the flanges of the double cell top 13, and to the exterior surface of the separator 19. The grommet 12 is fixed in position by a portion of which is held between the edges of inner and outer members 13a and 13b of the double top 13, and is supportingly held between the crimped end of outer cell container 17b and the outwardly curved portion of inner cell can 17a.

The dotted lines A and B show the potential migration paths of reaction products from the anode to the cathode whereby an internal short circuit can develop. These migration paths are initially prevented by adjusting the separator height so that there is a tight interference fit between the top of the separator 19 and the inner surface of the cell top 13a. However, during long term storage or discharge especially over three to five or more years the compressive fit between the separator top and the cell top can progressively relax as a result of gradual chemical deterioration of the cellulosic type separator constituents. Consequently, the separator can lose a degree of resiliency thereby allowing reaction products to migrate between the separator and the cell top. This can lead to eventual shorting of the cell and reduced cell life. The dotted lines C & D show the potential destinations of electronically conductive material. Since it is not necessary that there be a direct bridge between anode and cathode, even a shorter bridge between elements of opposite polarity such as the inner cell top 13a and inner container 17a as shown is sufficient to result in deleterious internal short circuiting. The migration of electronically conductive reaction materials is further aggravated by electrode expansion. For example, in amalgamated zinc cells the anode can expand to a volume of about 150% of its initial volume. This increased volume provides a pressure stress against the already weakened separator material at its interface with the cell top thereby accelerating the migration of the reaction materials and the formation of electronic bridging between anode and cathode.

Figure 2:
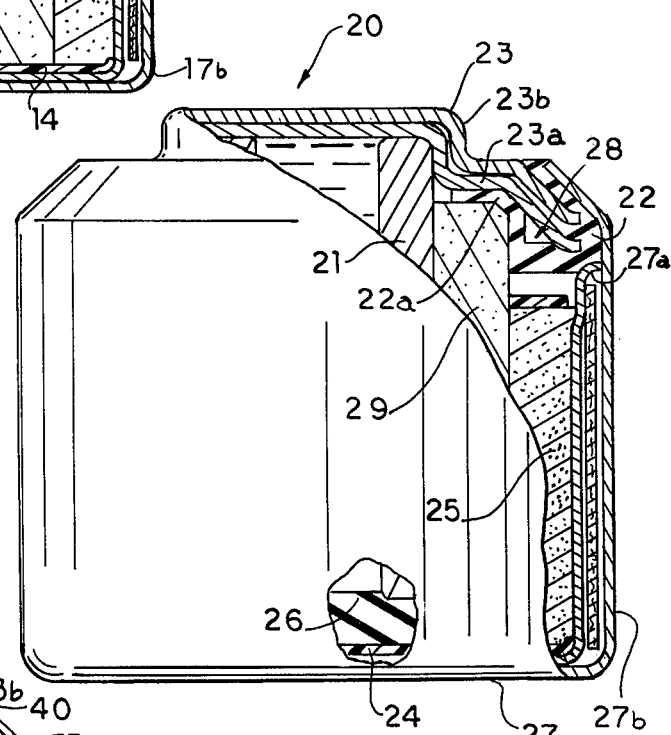
FIG. 2 is a partial cross-sectional view of the battery of the present invention having an improved grommet.

In FIG. 2, a grommet with a structure modified in accordance with the present invention is employed within the cell 20 which otherwise has an identical construction as the cell in FIG. 1. The cell is constructed in such manner that a radially inwardly extending extension 22a of the grommet 22 is positioned between the upper end of the separator 29 and the inner cell top 23a whereby the extension 22a is compressed between the separator 29 and the inner cell top member 23a.

There are several advantages to the modified grommet as compared to prior art grommets. Because of its highly resilient nature the grommet 22 with its extension 22a provides a tighter seal between the separator 29 and the inner cell top 23a since the resilient material conforms readily to the normal irregularities of the upper surface of the separator. Additionally, if the separator-grommet interface compression relaxes as a result of long term chemical degradation of the separator material the resilient grommet material follows the receding surface of the separator thereby maintaining seal integrity. Since the modification of the grommet is integral with the original grommet the entire inner surface of the inner cell top 23a is substantially electronically and mechanically shielded from the short electronic bridging migration path B as shown in the cell of the prior art depicted in FIG. 1. Accordingly, a considerably longer bridge between the anode itself and the cathode or cathode current collector is required to internally short circuit the cell. The modified grommet, as shown in FIG. 2, has the additional advantage of providing a well 28 which is capable of trapping the electronically conductive and mobile reaction products from further migration.

Figure 3:
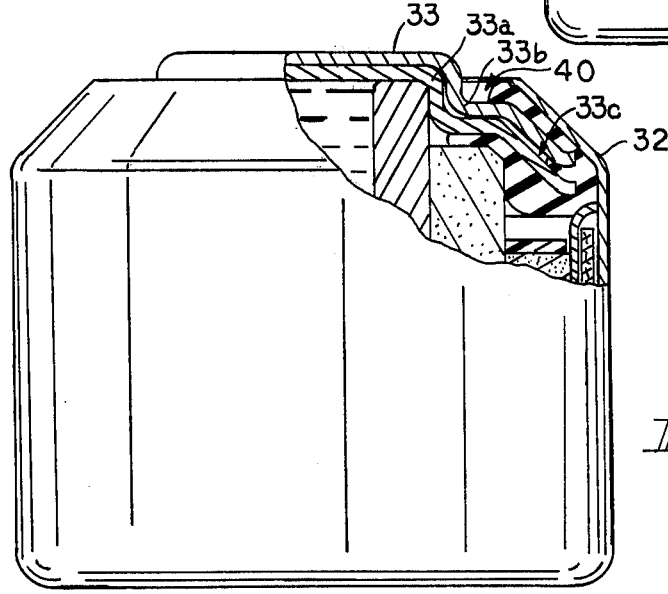
FIG. 3 is a partial cross-sectional view of an alternate embodiment of the battery of this invention having a molded-in-place grommet.

FIG. 3 shows a second embodiment of the modified grommet of the present invention. The grommet 22 in FIG. 2 is a separable component which is snapped over the end flanges of the cell top. The grommet 32 in FIG. 3 is one which is directly molded onto the flanges of the cell top 33. Because of molding requirements, the grommet 32 cannot readily be formed to include a well 28 as shown in FIG. 2, but it has the advantage of being more easily formed into a unitary construction. Additionally, the molded-on-grommet 32 provides a closer fit to the cell top 33 especially in the area 33c between the inner cell top member 33a the outer cell top member 33b. This helps prevent external electrolyte leakage. As shown, the molded-on grommet 32 can be made to provide an external well 40 for permitting the introduction of potting material therein whereby external electrolyte leakage is thereby prevented to an even greater extent. Materials useful in the construction of the grommet include neoprene, nylon, and polyolefins such as polyethylene and polypropylene. Neoprene is the preferred material because of its resilient nature and its ability to retain resiliency even under long term exposure to corrosive materials.

Separators used in the cells of the present invention are those having cellulosic components such as Dexter paper which is used as an electrolyte absorbent and Visking which functions as a cellulosic barrier. Other degradable cellulosic materials used in cells include non-woven cotten mats, woven nylon fabric treated with ion exchange resins, and non-woven CMC treated nylon.

The non-degradable portion of the separator is a polymeric material which functions as an electronic and particulate material barrier while it is pervious to ionic flow. Examples of polymeric separator materials include Synpor which is a trademark for a polyvinyl chloride (PVC) and microporous polyolefins such as polyethylene and polypropylene.

The most commonly used anodic material is mercury amalgamated zinc. Other anodic materials include cadmium and magnesium.

Common depolarizer materials for cells using the grommet of the present invention include mercury oxide with or without metallic silver, silver oxide, and manganese dioxide.

It is understood that changes and variations in cell structure as well as in the cell materials can be made without departing from the scope of the present invention as defined in the following claims.

What is claimed is:

1. A cylindrical electrochemical cell comprising an anode, a cathode, a separator having structural integrity therebetween, and an electrolyte, with said anode, cathode and separator being concentrically longitudinally axially disposed within a cell container having a closed bottom and an open top, said open top being closed by a cell top and an electronically insulative grommet positioned and compressively held between said cell container and said cell top, said cell top exerting a compressive force on an upper edge of said separator characterized by said grommet having an integral, radially inwardly directed portion compressively held between said separator upper edge and said cell top with a seal formed thereby.

2. The electrochemical cell of claim 1 wherein said separator comprises a degradable cellulosic material.

3. The electrochemical cell of claim 1 wherein said grommet is molded onto said cell top.

4. The electrochemical cell of claim 3 wherein said grommet forms an open well with said cell top exterior to said cell container.

5. The electrochemical cell of claim 1 wherein said grommet is comprised of a material selected from the group consisting of neoprene and polyolefins.

6. The electrochemical cell of claim 5 wherein said grommet is comprised of neoprene.

7. The electrochemical cell of claim 1 wherein said grommet is formed separately from said cell top and is fastened thereon.

8. The electrochemical cell of claim 7 wherein said grommet and said cell top form an enclosed well therebetween interior of said cell container.

* * * * *